United States Patent [19]

Miyauchi et al.

[11] 3,999,450
[45] Dec. 28, 1976

[54] THROTTLE VALVE FOR AUTOMOTIVE TRANSMISSION CONTROL SYSTEM

[75] Inventors: Toshiyuki Miyauchi; Kunio Ohtsuka, both of Yokohama, Japan

[73] Assignee: Nissan Motor Co., Ltd., Yokohama, Japan

[22] Filed: July 25, 1974

[21] Appl. No.: 491,941

[30] Foreign Application Priority Data

July 26, 1973 Japan .............................. 48-83556

[52] U.S. Cl. .................................. 74/864; 74/869
[51] Int. Cl.² ........................................ B60K 41/18
[58] Field of Search ............ 74/863, 864, 865, 867, 74/868, 869, 752 C

[56] References Cited

UNITED STATES PATENTS

| 3,274,848 | 9/1966 | Konrad et al. ........................ 74/864 |
| 3,387,508 | 6/1968 | Searles et al. .................... 74/867 X |
| 3,453,908 | 7/1969 | Iijima ................................... 74/867 |
| 3,625,322 | 12/1971 | Nagamatsu et al. .......... 74/864 UX |
| 3,685,372 | 8/1972 | Miyazaki ............................. 74/863 |
| 3,688,606 | 9/1972 | Lemieux et al. ..................... 74/863 |
| 3,714,836 | 2/1973 | Pierce, Jr. et al. .............. 74/864 X |
| 3,748,931 | 7/1973 | Schaefer et al. ..................... 74/867 |
| 3,768,339 | 10/1973 | Kolehmainen et al. ............. 74/864 |
| 3,771,388 | 11/1973 | Ishihara et al. .................. 74/864 X |

FOREIGN PATENTS OR APPLICATIONS 1,923,577 11/1969 Germany ............................. 74/863

Primary Examiner—Samuel Scott
Assistant Examiner—Lance W. Chandler

[57] ABSTRACT

A valve mechanism is comprised of first and second valves, the first valve producing a first fluid pressure in dependence on engine intake manifold vacuum while the second valve produces a second fluid pressure in response to the first pressure. A first valve spool is connected at its one end to a vacuum diaphragm responsive to the engine intake manifold vacuum. A valve spool land is exposed to the second pressurized fluid so that the spool is biased in one direction by the force developed by the second pressurized fluid acting on the valve land. A second valve spool is movable in response to the first fluid pressure to a position to reduce the pressure level of the second fluid when the engine intake manifold vacuum reaches a predetermined value.

3 Claims, 8 Drawing Figures

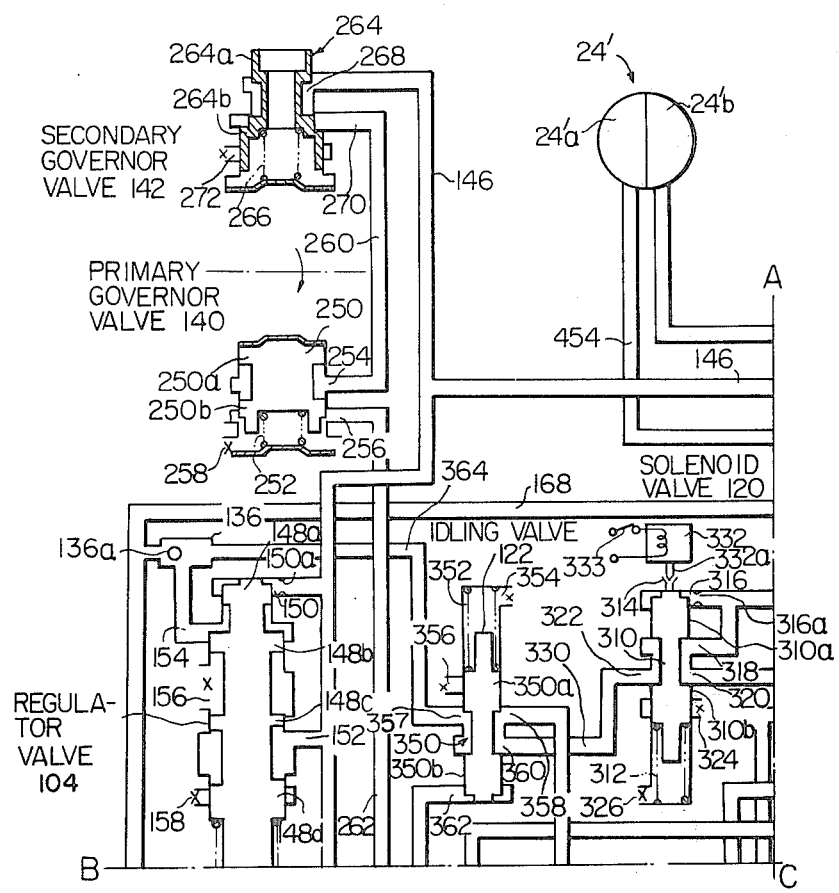

THROTTLE VALVE FOR AUTOMOTIVE TRANSMISSION CONTROL SYSTEM

This invention relates in general to a hydraulic control system for an automatic power transmission of a motor vehicle and, more particularly, to an improvement of the hydraulic control system of the transmission.

In an automatic power transmission used in a motor vehicle, it is customary to use a hydraulic control system for controlling the flow of fluid under pressure to different servo devices or friction elements which are rendered effective in sequence in order to make the successive shifts from one gear ratio to another. The fluid under pressure will be referred to line pressure hereinafter. To effect smooth shifting between the different gear ratios, it is desirable to change the torque capacity of the friction elements in accordance with the variations in engine torque. To this end, it has heretofore been proposed to employ a modulator valve such as a throttle valve which is arranged to produce a so-called throttle pressure dependent on the engine load. This throttle pressure is utilized for varying shifting points and varying the level of the line pressure.

Normally, the level of intake manifold vacuum of the vehicle engine in case of an internal combustion engine such as a reciprocating or rotary piston engine and an output torque thereof vary in approximate proportion to each other. However, there is a tendency that the engine torque varies sharply within a low range of the intake manifold vacuum. It is thus preferred that, in order to prevent shifting shocks, the throttle pressure and accordingly the line pressure be varied in the same manner as the variations of the intake manifold vacuum.

It is well known that the shifting point is set to be higher at low engine load and lower at high engine load whereby comfortable feeling is provided for the vehicle occupant. To achieve this, the shifting point may be preferably varied in close relationship to the variations in the engine load. More specifically, it is preferable to vary the level of the throttle pressure sharply between the high and low engine loads.

It is also well known that the relationship between the engine load and the engine torque depends on individual engines. Furthermore, where the engine intake manifold vacuum is utilized for various purposes as a parameter such as for operating exhaust gas treating devices or other accessories, the relationship between the engine load and the engine torque will become abnormal so that smooth shifting can not be obtained.

It is therefore an object of the present invention to provide an improved hydraulic control system for an automatic power transmission of a motor vehicle by which smooth shifting operation is obtained.

It is another object of the present invention to provide an improved fluid throttle valve for use in a hydraulic control system for an automatic power transmission.

It is still another object of the present invention to provide an improved throttle valve which can produce a throttle pressure in close relationship to torque characteristics of the vehicle engine.

It is a further object of the present invention to provide an improved throttle valve for a hydraulic control system of an automatic power transmission by which a throttle pressure is varied in a manner to provide an optimum shift pattern.

Other objects and advantages of the present invention will become more apparent from the following description when taken in conjunction with the accompanying drawings, in which:

FIG. 1 is a schematic diagram of an automatic power transmission of a motor vehicle employing a hydraulic control system of the present invention;

FIGS. 2a–2d, when matched at the matching lines, produce a schematic view of a hydraulic control system of a motor vehicle according to the present invention;

The hydraulic control system of the present invention is herein shown and described as applied to a motor vehicle having an automatic power transmission of the type having a hydrodynamic torque converter and providing basically four forward gear ratios and a reverse gear ratio as an example.

Figure 1:
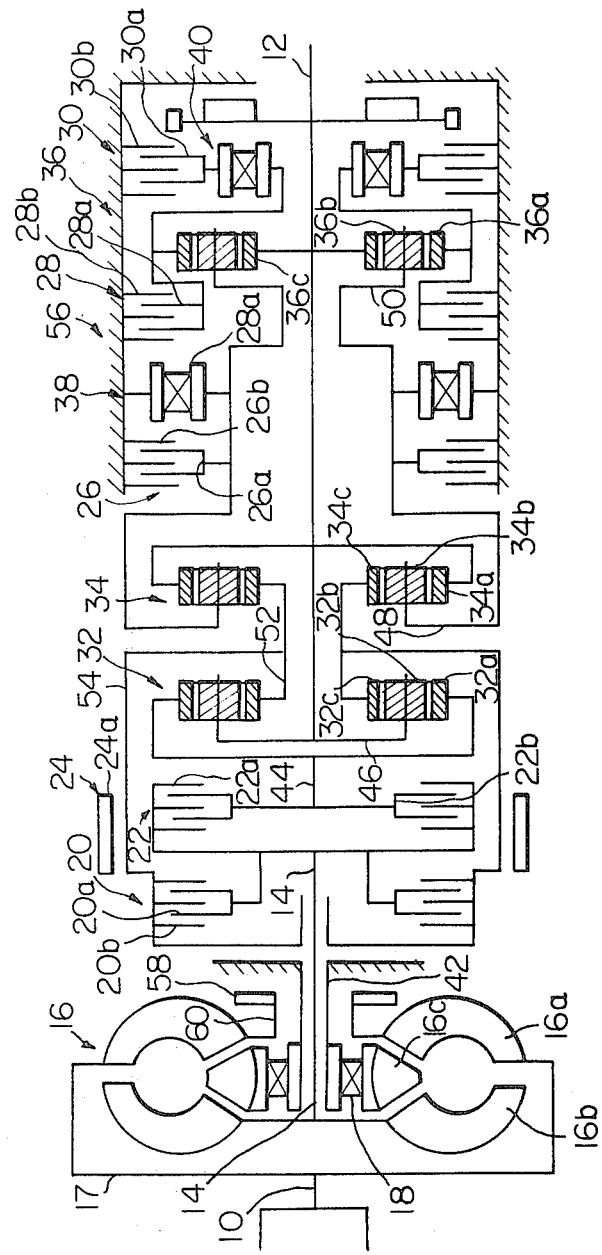
Figure 2B:
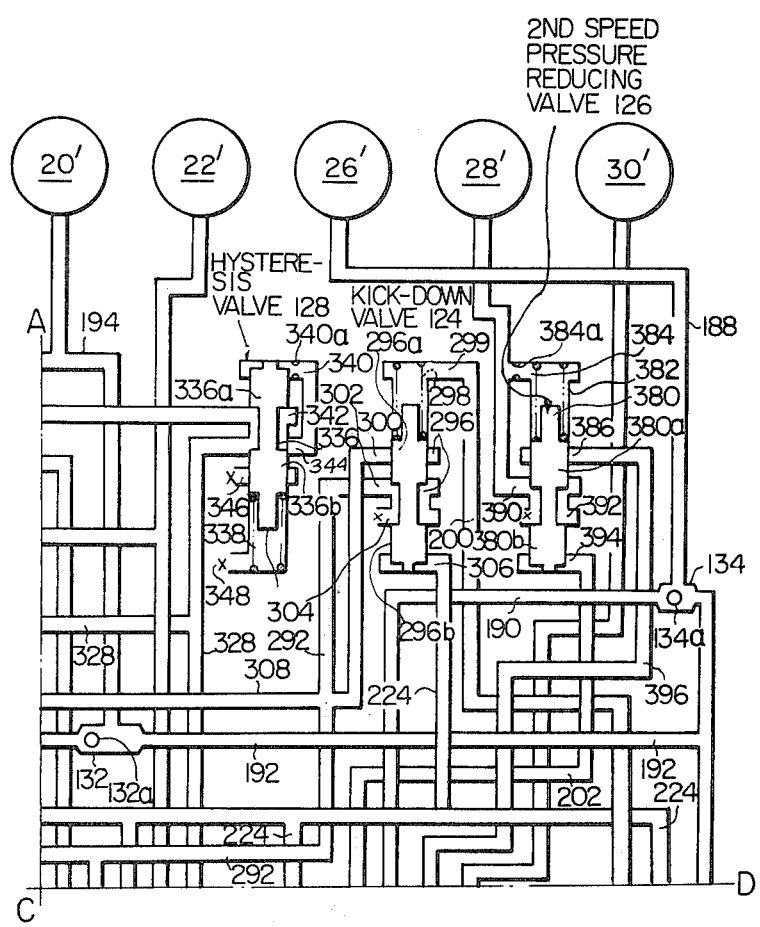
Figure 2C:
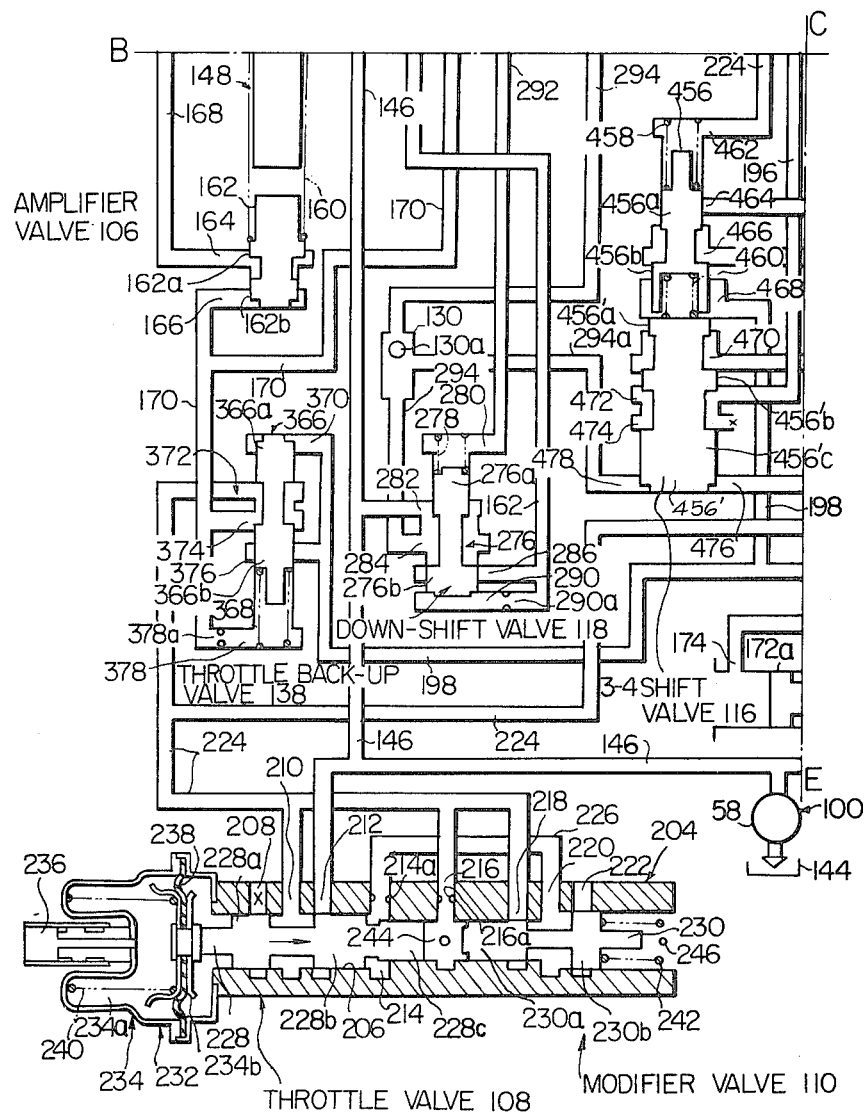
Figure 2D:
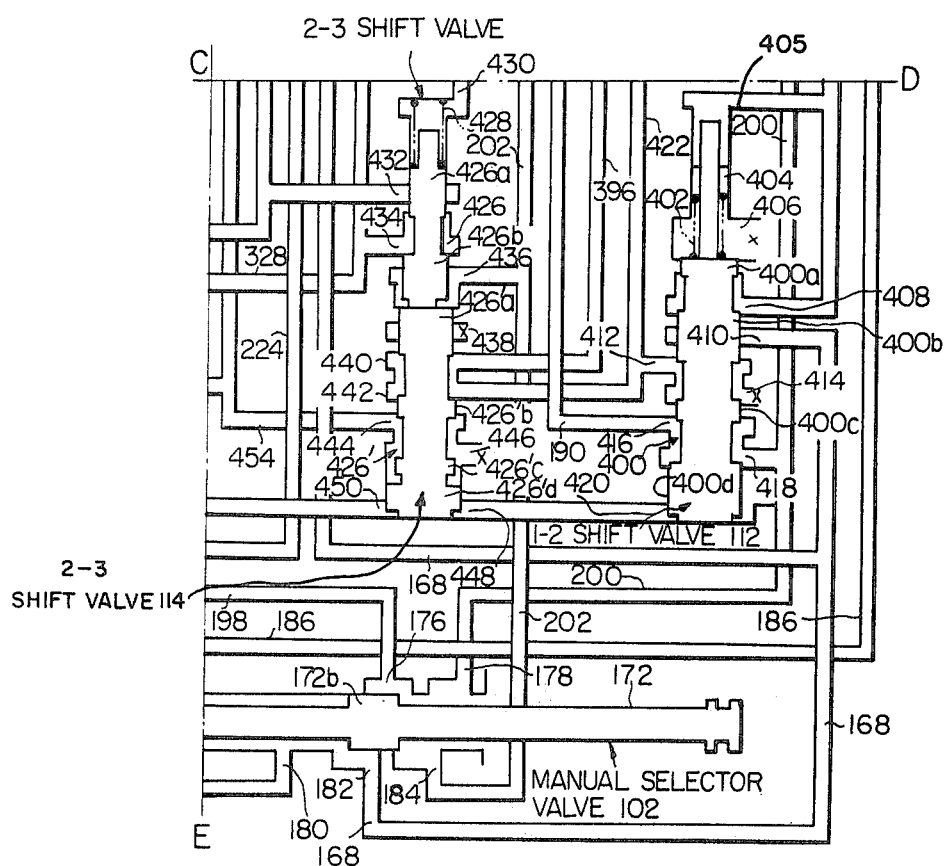

Referring now to FIG. 1, there is shown a motor vehicle automatic power transmission to which the throttle valve function of the hydraulic control system of the present invention is applied. The automatic power transmission generally comprises a transmission input shaft 10 and a transmission output shaft 12. The shaft 10 is connected to an engine, for instance, to an internal combustion engine E, and the shaft 12 is connected to the driving wheels (not shown) of the motor vehicle. The transmission herein shown also comprises a turbine shaft 14 which is axially aligned with the shaft 10 and the shaft 12. The transmission also comprises between shafts 10 and 14 a hydrodynamic torque converter 16 with a one-way brake 18, first and second hydraulically operated friction clutches 20 and 22, first, second, third and fourth hydraulically operated friction brakes 24, 26, 28 and 30, first, second and third planetary gear gets 32, 34 and 36, and first and second free-wheeling units 38 and 40.

The hydrodynamic torque converter 16 comprises, as customary, a vaned impeller or pump 16a, a vaned turbine 16b, and a vaned reaction element or stator 16c. The impeller 16a is connected through a drive plate 17 to the shaft 10, and the turbine 16b is fixed to the turbine shaft 14. The stator 16c is rotatably mounted on a hollow shaft 42, and the one-way brake 18 is mounted between the stator 16c and the hollow shaft 42.

The one-way brake 18 may be of any suitable construction and is arranged to allow a free rotation of the stator 16c ony in the forward direction of the vehicle, that is, in the direction in which the shaft 10 rotates but not in the reverse direction.

The torque converter 16 operates in a manner well known for driving the shaft 14 at an increased torque compared to the torque impressed on the impeller 16a of the converter. The stator 16c functions to change the direction of the flow of fluid from the impeller 16a to the turbine 16b to transfer this increased torque to the turbine 16b. The stator 16c initially tends to rotate in the same direction as the direction in which the turbine 16b and the impeller 16a rotate until certain speeds of the last two parts are reached, at which the torque converter 16 functions similarly to a fluid coupling in which the turbine 16b is driven at a substantially the same speed and without increase in torque with respect to the impeller 16a.

The first planetary gear set 32 has rotary members including an internally toothed outer ring gear 32a connected through an intermediate shaft 44 to the second hydraulically operated friction clutch 22, two or more planet pinions 32b which externally mesh respectively with the ring gear 32a and a sun gear 32c. The planet pinions 32b are carried by a first pinion carrier 46 which is connected to the transmission output shaft 12.

The second planetary gear set 34, similarly, has rotary members including an internally toothed outer ring gear 34a, two or more planet pinions 34b externally meshing with the outer ring gear 34a, and a sun gear 34c externally meshing with the planet pinions 34b. The planet pinions 34b are carried by a second pinion carrier 48 which is connectible with the second hydraulically operated friction brake 26, the first free-wheeling unit 38 and the third planetary gear set 36.

The third planetary gear set 36 also has rotary members including an internally toothed outer ring gear 36a associated with the third hydraulically operated friction brake 28 and the second free-wheeling unit 40, two or more planet pinions 36b externally meshing with the outer ring gear 36, and a sun gear 36c externally meshing with the planet pinions 36b. The planet pinions 36b are carried by a third pinion carrier 50 which is shown in FIG. 1 as being connected to the second pinion carrier 48. The sun gear 36c is connected to the shaft 12.

As illustrated, the sun gear 32c of the first planetary gear set 32 is rigidly connected to the sun gear 34c of the second planetary gear set 34 through a hollow shaft 52 which is rotatably mounted on the shaft 12.

The first friction clutch or front clutch 20 may be of any suitable construction and in the illustrated embodiment comprises a drive portion 20a connected to the turbine shaft 14, and a driven portion 20b connected to a brake drum 54 rigidly connected to the hollow shaft 52. The front clutch 20 also comprises a servomechanism, which will be described in detail hereinafter, for effecting engagement and disengagement of the drive portion 20a with the driven portion 20b when line pressure is applied and relieved, respectively.

The second friction clutch or rear clutch 22, similarly, comprises a drive portion 22a connected to the turbine shaft 14, and a driven portion 22b connected to the outer ring gear 32a of the first planetary gear set 32. The rear clutch also comprises a servomechanism (not shown) for engaging and disengaging the drive portion 22a with and from the driven portion 22b.

The first brake 24 comprises a brake band 24a adapted to act on the brake drum 54, and a servomechanism (not shown) for actuating the brake band to brake the drum 54 and the sun gears 32c and 34c of the first and second planetary gear sets 32 and 34 through the hollow shaft 52 rigidly connected to the sun gears 32c and 34c.

The second friction brake or low and reverse brake 26 comprises a rotor portion 26a connected to the pinion carriers 48 and 50 of the second and third planetary gear sets 34 and 36, and a stator portion 26b connected to the tramsmission casing 56. The friction brake 26 also comprises a servomechanism, although not shown in FIG. 1.

The thrid friction brake 28, similarly, comprises a rotor portion 28a connected to the outer ring gear 36a of the third planetary gear 36 and the second free-wheeling unit 40, and a stator portion 28b rigidly connected to the transmission casing 56. The friction brake 28 also comprises a servomechanism, although not shown in FIG. 1.

The forth friction brake 30 comprises a rotor portion 30a connected to the second free-wheeling unit 40, a stator portion 30b rigidly connected to the transmission casing 56, and a servomechanism (not shown).

The first free-wheeling unit or low one-way brake 38 has an inner race 38a connected to the pinion carriers 48 and 50 of the second and third planetary gear sets 34 and 36, respectively. The low one-way brake 38 may be of any suitable construction insofar as it functions to allow a free rotation of the pinion carriers 48 and 50 in the direction in which the engine output shaft 10 rotates but not in the reverse direction.

The second free-wheeling unit or second one-way brake 40 is mounted between the rotor portion of the friction brake 30 and the outer ring gear 36a of the third planetary gear set 36, and serves to allow free rotation of the outer ring gear 36a of the third planetary gear set 36 in the direction in which the engine output shaft 10 rotates but not in the reserve direction.

Indicated at 58 is a fluid pump which is connected through a hollow shaft 60 to the impeller 16a of the torque converter 16 and driven thereby.

The automatic power transmission thus arranged operates in a well known manner to provide four forward driving gear ratios and a single reverse driving gear ratio by selectively engaging and disengaging the clutch 20, the clutch 22, the brake 24, the brake 26, the brake 28 and the brake 30 in a manner as shown in the Table.

In the Table, the symbol "+" denotes that the friction elements and the free-wheeling units are engaged. In this Table, the values of the gear ratios in the respective drive ranges are calculated on the basis that the outer ring gears 32a, 34a and 36a each have 80 teeth and that the sun gears 32c, 34c and 36c each have 37 teeth. However, it is obvious that different values of gear ratios can be obtained by varying the number of teeth of the ring gears and the sun gears.

In the illustrated embodiment the various gear ratios are obtainable as well known in the art and detailed descriptions will be omitted.

TABLE

| | | Clutch 20 | Clutch 22 | Brake 24 | Brake 26 | One-way Brake 38 | Brake 28 | Brake 30 | One-way Brake 40 | Gear Ratio |
|---|---|---|---|---|---|---|---|---|---|---|
| Automatic (D) Drive Range | $D_1$ | | + | | | + | | | | 2.46 |
| | $D_2$ | | + | | | | | + | + | 2.00 |
| | $D_3$ | | + | + | | | | | | 1.46 |
| | $D_4$ | + | + | | | | | | | 1.00 |
| | 1 | | + | | | + | + | | | 2.46 |

TABLE-continued

| | | Clutch 20 | Clutch 22 | Brake 24 | Brake 26 | One-way Brake 38 | Brake 28 | Brake 30 | One-way Brake 40 | Gear Ratio |
|---|---|---|---|---|---|---|---|---|---|---|
| Manual Drive Range | 2 | | + | | | | + | | | 2.00 |
| | 3 | | + | + | | | | | | 1.46 |
| Reverse | | + | | | + | | | | | 2.16 |

Footnote: The gear ratios means ratios of shaft 10 rpm to shaft 12 rpm.

The first forward driving gear ratio in the manual first or "1" range position is established by engaging he clutch 22 and the brake 26. With the brake 26 engaged, a two-way drive connection is established between the engine and the driving wheels of the motor vehicle so that engine braking action takes place when the power flow is reversed. The first forward driving gear ratio in the automatic drive range "D" is obtained when the clutch 22 and the one-way brake 38 are engaged.

A description of the reversed power flow will be made when the shaft 12 drives the turbine shaft 14.

As the shaft 12 rotates, the outer ring gear 34a of the second planetary gear set 34 rotates at the same speed as the shaft 12. Since, in this instance, the pinion carrier 48 of the second planetary gear set 34 is locked by brake 26 or the one-way brake 38 during first range forward driving, the sun gear 34c of the second planetary gear set 34 rotates at a given speed and the sun gear 32c of the first planetary gear set 32 connected thereto rotates at the same speed as the sun gear 34c. Since, in this condition, the pinion carrier 46 of the first planetary gear set 32 rotates at the same speed as the shaft 12, the outer ring gear 32a of the first planetary gear set 32 rotates at a speed which is determined by the rotational speeds of the pinion carrier 46 and the sun gear 32c. This rotation of the outer ring gear 32a is transmitted to the turbine shaft 14 through the intermediate shaft 44 and the rear clutch 22 which is engaged. It is clear that the power flow actually takes place from the turbine shaft 14 to the driven shaft 12 in a manner opposite to that mentioned hereinabove when the engine is driving the car.

A second forward driving gear ratio in the manual second speed or "2" range position is established when the second coasting brake 28 is applied with the rear clutch 22 kept engaged. When the second coasting brake is applied, the engine braking action takes place in the same manner as in the manual first speed. A second forward driving speed ration in the automatic drive range or "D" range position is established when the rear clutch 22 and the second driving brake 30 are engaged. A description of the power flow in this drive range will also be made on the assumption that the power flow takes place from the driven shaft 12 to the turbine shaft 14.

As the driven shaft 12 rotates, the sun gear 36c of the third planetary gear set 36 rotates at the same speed as the driven shaft 12. Under this circumstance, since the outer ring gear 36a of the third planetary gear set 36 is locked by the second coasting brake 28 or the second driving brake 30 via the second one-way brake 40, the pinion carrier 50 of the third planetary gear set 36 rotates at a given speed.

Since, moreover, the outer ring gear 34a of the second planetary gear set 34 is connected to the driven shaft 12 and the pinion carrier 48 of the second planetary gear set 34 is connected to the pinion carrier 50 of the third planetary gear set 36, the sun gear 34c of the second planetary gear set 34 rotates at a speed which is determined by the rotational speeds of the outer ring gear 34a of the second planetary gear set 34 and the pinion carrier 48 thereof. During this driving condition, since the pinion carrier 46 of the first planetary gear set 32 is connected to the driven shaft 12 and the sun gear 32c is connected to the sun gear 34c, the outer ring gear 32a of the first planetary gear set 32 rotates at a speed which is determined by the sun gear 32c and the pinion carrier 46. Since the outer ring gear 32a is connected to the turbine shaft 14 through the rear clutch 22, the turbine shaft 14 rotates at the same speed as the outer ring gear 32a of the first planetary gear set 32. As previously stated, it should be noted that the power flow actually takes place from the turbine shaft 14 to the driven shaft 12.

At third forward driving speed ratio in the manual third speed or "3" range position or in the automatic drive range "D" is accomplished when the band brake 24 is applied with the rear clutch 22 kept engaged. In this condition, the rotation of the turbine shaft 14 is transmitted through the rear clutch 22 to the outer ring gear 32a of the first planetary gear set 32. Since, in this instance, the sun gear 32c of the first planetary gear set 32 is locked by the band brake 24, the pinion carrier 46 of the first planetary gear set 32 rotates at a given speed and the driven shaft 12 rotates at the same speed as the pinion carrier 46.

A fourth forward driving speed ratio is obtained in the automatic drive "D" range in which the front clutch 20 and the rear clutch 22 are engaged. In this situation, the sun gear 32c and the outer ring gear 32a of the first planetary gear set 32 rotate at the same speed as the turbine shaft 14 and, consequently, the pinion carrier 46 rotates at the same speed as the turbine shaft 14. Thus, the direct drive is established between the turbine shaft 14 and the driven shaft 12.

A reverse drive is completed by engaging low and reverse brake 26 with the front clutch 20 kept engaged. In this condition, rotation of the turbine shaft 14 is transmitted through the front clutch 20 and the brake drum 54 to the sun gear 34c of the second planetary gear set 34. Since, in this situation, the pinion carrier 48 of the second planetary gear set 34 is locked by the low and reverse brake 26, the outer ring gear 34a rotates at a given speed in a direction opposite to that of the turbine shaft 14. This reverse rotation of the outer ring gear 34a is transmitted to the driven shaft 12 and, thus, the reverse drive is obtained.

The friction clutches and brakes of the transmission are operated by a hydraulic control system according to the present invention, which is schematically shown in FIGS. 2a–2d. As shown, the hydraulic control system generally comprises a source 100 of fluid under pressure, a manual selector valve 102, a regulator valve 104, an amplifier valve 106, a throttle valve 108, a modifier valve 110, a 1-2 shift valve 112, a 2-3 shift valve 114, a 3-4 shift valve 116, a downshift valve 118, a solenoid valve 120, an idling valve 122, a kick-down valve 124, a second speed pressure reducing valve 126, a hysteresis valve 128, a first floating valve 130, a second floating valve 132, a third floating valve 134, a fourth floating valve 136, a throttle back-up valve 138, and primary and secondary governor valves 140 and 142.

The source 100 of fluid under pressure may comprise the fluid pump 58 which sucks fluid from a sump 144 and delivers it into a line pressure conduit 146 communicating with the regulator valve 104. The pressure of fluid will be referred to as line pressure hereinafter.

The regulator valve 104 operates in a manner well known to regulate the level of the line pressure admitted thereto for effecting smooth engagement of the friction elements. As shown, the regulator valve 104 comprises a slidable valve spool 148 having a plurality of spaced valve lands 148a, 148b, 148c and 148d. The regulator valve 104 has a plurality of ports 150, 152, 154, 156 and 158. The port 150 has a flow restriction or orifice 150a and communicates with the line pressure conduit 146, with which the port 152 also communicates. The port 154 communicates through the floating valve 136 with the idling valve 122 which will be subsequently described in detail. It will be noted that the port 154 is supplied with line pressure through the manual selector valve 102 during forward driving and supplied with hysteresis pressure through the idling valve 122 during idling operation of the engine whereby the valve spool 148 is moved downward, viz., in a direction to reduce the line pressure when the manual selector valve 102 is moved to the "R" range position from the "N" range position. The port 156 is a drain through which the line pressure is drained off. The port 158 is hydraulically connected to the hydrodynamic torque converter of the automatic power transmission shown in FIG. 1 and delivers line pressure thereto. The regulator valve 104 also comprises a biasing means such as a compression spring 160 to urge the valve spool 148 upward, viz., in a direction to increase the line pressure. The compression spring 160 cooperates with the amplifier valve 106, which comprises a slidable valve spool 162 having spaced valve lands 162a and 162b. The amplifier valve 106 has ports 164 and 166. The port 164 communicates through a conduit 168 with the manual selector valve 102 to receive line pressure therefrom. The port 166 communicates through a conduit 170 with the idling valve 122 and the throttle back-up valve 138, which are subsequently described in detail.

The manual selector valve 102 is usually linked through a mechanical linkage with a manual selector lever (not shown). The manual selector valve 102 has the following positions: p or parking position, "R" or reverse drive position, "N" or neutral position, "D" or automatic forward drive position, "3" or manual third gear position, "2" or manual second gear position and "1" or manual first gear position. The manual selector valve 102 comprises a slidable valve spool 172 having spaced valve lands 172a and 172b, and is movable to different positions to change the flow of line pressure in response to the selected position of the manual selector lever. The manual selector valve 102 has a plurality ports 174, 176, 178, 180, 182 and 184.

The port 174 communicates with a conduit 186, which in turn communicates with conduits 188 and 190 through the floating valve 134 and also communicates with a conduit 192. The conduit 188 communicates with a servo mechanism 26' of the brake 26. The conduit 190 communicates with the 1-2 shift valve 112. The conduit 192 communicates through the second floating valve 132 with conduits 194 and 196. The conduit 194 communicates with release side 24'b of a servo mechanism 24' of the band brake 24 and also communicates with a servo mechanism 20' of the front clutch 20. The conduit 196 communicates with the 3-4 shift valve 116.

The port 176 of the manual selector valve 102 communicates through a conduit 198 with the 3-4 shift valve 116 and the throttle back-up valve 138.

The port 178 of the manual selector valve 102 communicates through a conduit 200, with the 1-2 shift valve 112 and the kick-down valve 124.

The port 180 of the manual selector valve 102 communicates through the line pressure conduit 146, with the regulator valve 104 and the throttle valve 108. As shown, the line pressure conduit 146 is also in communication with the secondary governor valve 142, the hysteresis valve 128 and the down-shift valve 118.

The port 182 of the manual selector valve 102 communicates with the conduit 168 leading from the regulator valve 104 and the amplifier valve 106. As shown, the conduit 168 also communicates with a servo mechanism 22' of the rear clutch 22.

The port 184 of the manual selector valve 102 communicates through a conduit 202 with the 2-3 shift valve 114 and the second speed pressure reducing valve 126.

The throttle valve 108 coacts with the modifier valve 110 to produce throttle pressure in close relationship with the vehicle engine load to control the level of the line pressure to be applied to the various servo mechanisms of the friction elements and to change the shifting points of the automatic power transmission. To this end, the throttle valve 108 and the modifier valve 110 in the illustrated embodiment commonly comprise a valve casing 204 in which a valve chamber 206 is formed. The valve casing 204 has a plurality of ports 208, 210, 212, 214, 216, 218, 220 and 222. The port 208 serves as a drain through which excessive fluid is drained off. The port 210 communicates with a conduit 224, with which the ports 216 and 218 also communicate. As shown, the port 216 has a flow restriction 216a therein. The conduit 224 communicates with the throttle back-up valve 138, 3-4 shift valve 116, 2-3 shift valve 114 and 1-2 shift valve 112. The port 212 communicates with the line pressure conduit 146 which is in communication with the regulator valve 104 and the manual selector valve 102. The port 214 has a flow restriction 214a and communicates therethrough with a conduit 226, with which the port 220 also communicates. The port 222 serves as a drain through which excessive fluid is drained off. The throttle valve 108 and the modifier valve 110 also comprise slidable valve spools 228 and 230 which are disposed in the valve chamber 206 and aligned in axial relationship. The slidable valve spool 228 has a plurality of spaced valve lands 228a, 228b and 228c. Likewise, the slidable valve spool 230 has spaced valve lands 230a and 230b. The valve land 228a controls the degree of fluid communication between the ports 208 and 210. The valve land 228b controls the degree of fluid communication between the ports 210 and 212. The valve land 230a of the valve spool 230 controls the degree of fluid communication between the ports 218 and 220, and the valve land 230b controls the degree of fluid communication between the ports 220 and 222.

As shown, the throttle valve 108 further comprises a diaphragm assembly 232 which is actuated by the engine intake manifold vacuum. The diaphragm assembly 232 includes a diaphragm casing 234 having a vacuum chamber 234a communicating with the engine intake manifold (not shown) through a pipe 236 and an air chamber 234b vented to the atmosphere, a diaphragm member 238 fixedly connected to one end of the valve spool 228 of the throttle valve 108 and movable therewith, and a biasing means such as compression spring 240 urging the diaphragm member 238 and accordingly the valve spool 228 rightward, viz., in a direction to increase the degree of fluid communication between the ports 210 and 212. The modifier valve 110 further comprises a biasing means 242 to urge the valve spool 230 leftward, and two stoppers 244 and 246 which prevent excessive movements of the valve spool 230. It is to be noted that the diaphragm member 238 and accordingly the valve spool 228 connected thereto are movable to different positions in dependence on the engine intake manifold vacuum thereby to vary the level of the throttle pressure in dependence thereon. In the illustrated embodiment, the port 212 of the throttle valve 108 is supplied with line pressure from the line pressure conduit 146. The line pressure in the port 212 is admitted to the port 210, through which the line pressure is admitted to the port 216 through the flow restriction 216a and to the port 218 via the conduit 224 when the port 212 is brought into fluid communication with the port 210. The line pressure thus admitted to the port 216 acts on the respective ends of the valve spools 228 and 230 so that the valve spool 228 is moved leftward against the force of the compression spring 240 while the valve spool 230 is moved rightward against the force of the compression spring 242.

It should be noted that the valve spool 228 is maintained at its balanced position where the force developed by the diaphragm assembly 234 balances with the force developed by the line pressure acting on the valve land 228c and the force developed by the line pressure acting on the differential sectional area between the valve lands 228b and 228c. It should in this instance be understood that the line pressure acting on the differential sectional area between the valve lands 228b and 228c is admitted through the flow restriction 214a, the conduit 226, the port 220, the port 218 into the conduit 224. Thus, the level of fluid under pressure in the port 210 is determined by the position of the valve spool 228. This fluid under pressure in the port 210 has been referred to as the throttle pressure hereinabove. Assuming that the level of the throttle pressure is $P_{th1}$, cross sectional area of the valve land 228c is $A_1$, the differential area between the valve lands 228b and 228c is $A_2$, and the force developed by the diaphragm assembly 234 acting on the valve spool 228 in the rightward direction is F, the following equation holds:

$$P_{th1} = (F/A_2 + A_1)$$

From this equation, it will be apparent that as the magnitude of the force F increases, the level of the throttle pressure $P_{th1}$ also increases. This throttle pressure $P_{th1}$, which appears at the port 210 of the throttle valve 108, is delivered to the port 216 through the flow restriction 216a and to the port 218 of the modifier valve 110, and acts on the end of the valve land 230a and the differential sectional area between the valve lands 230a and 230b. Since, as shown in FIG. 2, the valve land 230b is larger in cross section than the valve land 230a, the valve spool 230 is moved rightward against the force of the compression spring 242. As the level of the throttle pressure $P_{th1}$ reaches a predetermined value, the valve spool 230 of the modifier valve 110 is moved to the position in which the valve land 230a closes the port 218 while the valve land 230b opens the port 222. Thus, the valve spool 230 assumes its balanced position where the forces developed by the throttle pressure acting on the valve land 230a and the throttle pressure acting on the differential cross sectional area between the valve lands 230a and 230b balance with the force of the compression spring 242. It will be seen that the level of the pressure in the port 220 decreases as the level of the throttle pressure in the port 216 increases. This relationship is expressed by the following equation:

$$P_{th2} = (F_1 - A_2 \times P_{mod}/A_1)$$

Where
$P_{th2}$ is the throttle pressure in the port 216
$P_{mod}$ is the pressure in the port 220
$F_1$ is the force of the compression spring 242
$A_1$ is the cross sectional area of the valve land 230a, and
$A_2$ is the differential cross sectional area between the valve lands 230a and 230b.

It will thus be understood that if the throttle pressure $P_{th2}$ exceeds a certain higher level, the valve spool 230 is further moved rightward. In this condition, the port 220 is brought into fluid communication with the port 222 so that the pressure level in the port 220 reaches zero. In this case, the throttle pressure $P_{th3}$ in the port 216 is expressed by the following equation:

$$P_{th3} = F/A_1$$

Where
F is the force acting on the valve spool 228, and
$A_1$ is the effective cross sectional area of the valve land 228c of the valve spool 228.

Figure 3:
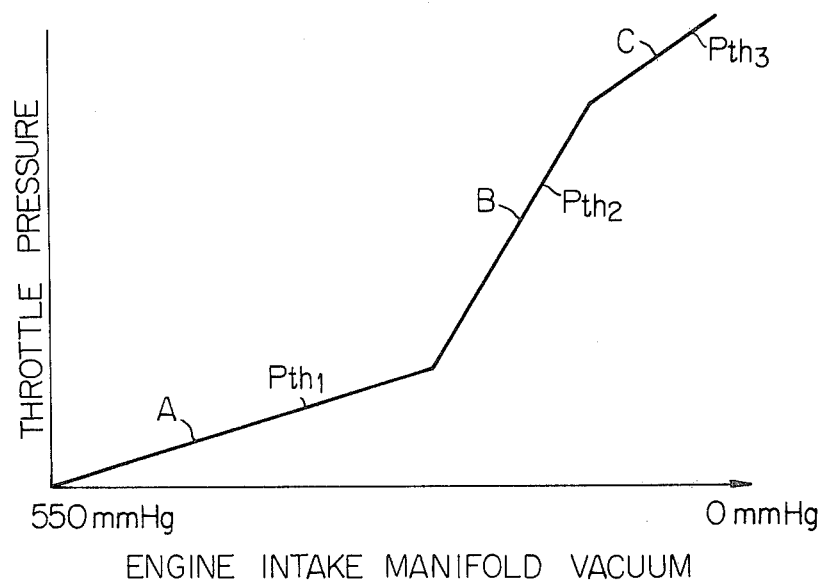
FIG. 3 is a view illustrating the characteristics of a throttle valve used in the hydraulic control system of FIG. 2.

FIG. 3 shows the relationship between the throttle pressure and the engine intake manifold vacuum. As indicated by the curve A, the level of the throttle pressure $P_{th1}$ varies slowly when the engine intake manifold vacuum is at a high value. When the engine intake manifold vacuum is at a relatively low value, the throttle pressure $P_{th2}$ varies sharply as shown by the curve B and, when the engine intake manifold vacuum reaches a still lower value, the throttle pressure $P_{th3}$ varies slowly as shown by the curve C.

It should be understood that the characteristic of the throttle pressure can be modified by varying the cross sectional areas of the valve lands 228b and 228c and by varying the preload of the spring 240 of the diaphragm assembly 234 so as to meet the characteristic of the engine performance.

Figure 4:
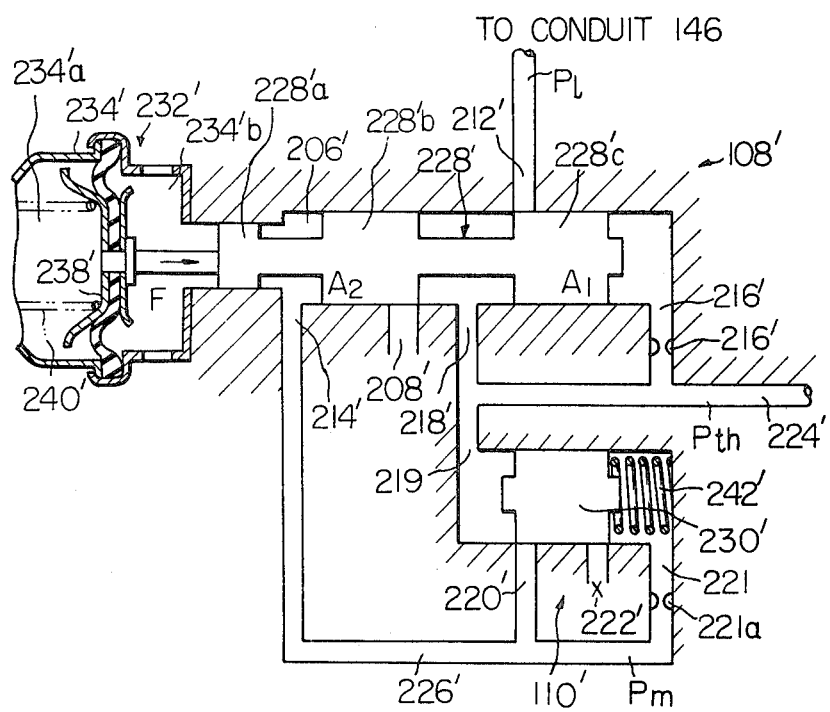
FIG. 4 is a fragmentary section view of a modification of a throttle valve used in the hydraulic control system of FIG. 2.

A modified form of the throttle valve is illustrated in FIG. 4, in which like or corresponding component parts are designated by the same reference numerals as those used in FIG. 2 with the exception that a prime (') has been added to them, respectively. In this modification, the throttle valve 108' comprises a valve spool 228' slidably disposed in a valve chamber 206' and having spaced valve lands 228'a, 228'b and 228'c. As shown, the valve spool 228' is connected at its left end with a diaphragm member 238' of the diaphragm assembly 232' having a spring 240' urging the diaphragm member 238' rightward with a force F. The throttle valve 108' has a plurality of ports 212', 214', 216', 218' and 208'. The port 212' communicates with the conduit 146. The port 214' communicates with the modifier valve 110'. The port 216' communicates through a flow restriction 216'a with a conduit 224', with which the port 218' also communicates. The port 208' is a drain through which excessive fluid is drained off. The modifier valve 110' comprises a slidable valve spool 230' which is disposed parallel to the axis of the valve spool 228' of the throttle valve 108', and a biasing means 242' such as compression spring to urge the valve spool 230' leftward. The modifier valve 110' has a plurality of ports 219, 220', 221 and 222'. The port 219 communicates with the port 218' of the throttle valve 108'. The port 220' communicates with the port 214' of the throttle valve 108' through a by-pass conduit 226', with which the port 221 also communicates via a flow restriction 221a. This port 220' is opened and closed by the valve spool 230' and communicates with the port 219 when the valve spool 230' opens the port 220'. The port 222' is a drain through which excessive fluid is drain off. With this construction, the throttle pressure in the conduit 224' is fed into the ports 216' and 218' of the throttle valve 108', and also fed into the port 219 of the modifier valve 110'. The throttle pressure admitted to the port 216' acts on the end of the valve land 228'c. The throttle pressure in the port 219 acts on the valve spool 230' thereby moving the same rightward as viewed in FIG. 4 against the action of the compression spring 242'. When the engine intake manifold vacuum is high, the force F which tends to move the valve spool 228' rightward due to the difference in force of the spring 240' and the force developed by the engine intake manifold vacuum acting on the diaphragm member 238' balances with the opposing force developed by the throttle pressure acting on the valve land 228'c of the valve spool 228'. This relation is represented by the following equation:

$$F = A_1 \cdot P_{th}$$

Where
$A_1$ is the cross sectional area of the valve land 228'c and
$P_{th}$ is the throttle pressure in the port 216'.
This relationship is indicated by the curve A' in FIG. 5. As the intake manifold vacuum decreases, the throttle pressure increases in inverse proportion thereto. This is because of the fact that, when the engine intake manifold vacuum decreases from a high level, the force F acting on the valve spool 228' increases and the valve spool 228' is moved rightward as viewed in FIG. 4 against the force developed by the throttle pressure acting on the valve land 228'c whereby the degree of fluid communication between the ports 208' and 218' decreases and the amount of fluid drained through the drain port 208' also decreases. As the throttle pressure exceeds a predetermined level, the throttle pressure admitted to the port 219 and acting on the valve spool 230' causes the same to move rightward as viewed in FIG. 4 against the force of the spring 242' so that the port 220' is opened whereby the throttle pressure is admitted thereto. The throttle pressure thus admitted to the port 220' is fed through the conduit 226' and the flow restriction 221a into the port 221. The throttle pressure thereafter acts also on the right side of the valve spool 230' and the valve spool 230' is moved leftward by the spring 242' so that the drain 222' is opened to drain fluid therethrough to produce a modulated pressure $P_m$. This modulated pressure $P_m$ is fed through the conduit 226' into the port 214' of the throttle valve 108' and acts on the differential cross sectional area $A_2$ between the valve lands 228'a and 228'b. In this situation, the following equation holds:

$$F + P_m \cdot A_2 = A_1 \cdot P_{th}$$

Figure 5:
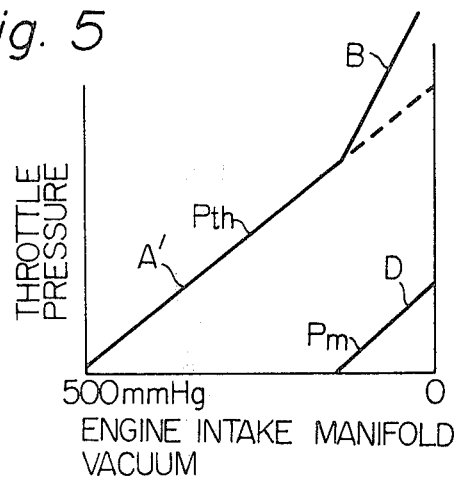
FIG. 5 is a view illustrating the characteristics of the throttle valve shown in FIG. 4.

This relation is expressed by the curve B' in FIG. 5, in which the curve D indicates variations of the modulated pressure $P_m$.

The throttle pressure thus produced by the throttle valve 108 is fed into the line pressure conduit 146, into which governor pressure dependent on the vehicle speed is also fed. Thus, the shifting points are determined by the throttle pressure and the governor pressure.

Turning now back to FIGS. 2a–2d the primary governor valve 140 comprises a valve spool 250 slidably disposed in a casing (no numeral) fixed to the output shaft of the automatic power transmission, and a compression spring 252 urging the valve spool 250 radially inward. The valve spool 250 has spaced valve lands 250a and 250b. The primary governor valve 140 has a plurality of ports 254, 256 and 258. The port 254 communicates with a conduit 260, with which the secondary governor valve 142 also communicates. The port 256 communicates with a conduit 262, which in turn communicates with the downshift valve 118. The port 258 is a drain through which fluid is drained off when the port 256 is opened by the valve land 250b of the valve spool 250.

The secondary governor valve 142 comprises a valve spool 264 slidably disposed in a casing (no numeral) fixed to the transmission output shaft and a compression spring 266 urging the valve spool 264 radially outward. The valve spool 264 has spaced valve lands 264a and 264b. The secondary valve 142 has a plurality of ports 268, 270 and 272. The port 268 communicates with the line pressure conduit 146, with which the hysteresis valve 128 also communicates. The port 270 communicates through the conduit 260 with the primary governor valve 140. The port 272 is drain through which excessive fluid is drained off. Since the valve land 264b is larger in cross section than the valve land 264a, the valve spool 264 is held in its balanced position where the force developed by the line pressure acting on the differential area between the valve lands 264a and 264b of the valve spool 264 balances with the force of the compression spring 266. As the revolutional speed of the transmission output shaft increases and accordingly the centrifugal force acting on the valve spool 264 increases, the level of the line pressure in the port 270 increases. It will thus be seen that the level of the line pressure in the conduit 260 is dependent on the revolutional speed of the transmission output shaft.

In the primary governor valve 140, the valve spool 250 is moved radially inward by the action of the compression spring 252 when the revolutional speed of the transmission output shaft is below a certain given value (for example, 500 rpm). In this situation, the port 254 is prevented from communicating with the port 256 by the valve land 250b of the valve spool 250, while the port 256 is opened and brought into communication with the drain port 258 by the valve land 250b so that the level of the line pressure in the conduit 262 is reduced to zero. As the revolutional speed of the transmission output shaft increases, the valve spool 250 is moved radially outward against the action of the compression spring 252 due to the centrifugal force acting on the valve spool 250. In this condition, the port 254 is brought into fluid communication with the port 256 so that the line pressure in the conduit 260 dependent on the vehicle speed is fed into the conduit 262. It will thus be understood that the primary and secondary governor valves 140 and 142 cooperate with each other to produce a governor pressure in the conduit 262 dependent on the vehicle speed after the vehicle speed, namely, the revolutional speed of the transmission output shaft is above a predetermined value whereas, when the vehicle speed is below the predetermined value, the governor pressure is not produced in the conduit 262. The governor pressure thus admitted to the conduit is fed into the down-shift valve 118.

The down-shift valve 118 comprises a valve spool 276 having spaced valve lands 276a and 276b, and a compression spring 78 urging the valve spool 276 downward. The down-shift valve 118 has a plurality of ports 280, 282, 284, 286 and 290. The port 280 communicates with a conduit 292 communicating with the kick-down valve 124, the 2-3 shift valve 114 and the 3-4 shift valve 116. The port 282 communicates with the line pressure conduit 146. The port 284 communicates with a conduit 294 in which the floating valve 130 having a movable ball 130a is disposed, and with which the idling valve 122 communicates. A conduit 294a is branched off from the conduit 294 through the floating valve 130 and communicates with the 3-4 shift valve 116, the 2-3 shift valve 114 and the 1-2 shift valve 112. The port 286 communicates with the conduit 262, with which the port 290 having formed therein a flow restriction 290a communicates to receive the governor pressure from the primary governor valve 140. During kick-down operation, a signal pressure is applied to the port 280 of the down-shift valve 118 from the kick-down valve 124 and, during other operations, the conduit 292 is held in communication with a drain of the kick-down valve 124. When the kick-down operation is not effected, the line pressure admitted to the port 282 acts on the differential cross sectional area between the valve lands 276a and 276b thereby applying the force onto the valve spool 276 tending to move the same downward. The valve spool 276 is held in its balanced position where the force of the compression spring 278 and the force developed by the line pressure acting on the differential cross sectional area between the valve lands 276a and 276b balances with the force developed by the governor pressure acting on the valve land 276b. The governor pressure admitted to the port 290 from the primary governor valve 140 will be referred to as a base governor pressure hereinafter. In this instance, as the base governor pressure increases, the valve spool 276 is moved upward against the force of the compression spring 278 and the force developed by the line pressure at the port 282 acting on the differential of the cross sectional areas of the valve lands 276a and 276b, so that the degree of fluid communication between the ports 284 and 282 is varied. Thus, the level of the line pressure in the port 284 depends on the level of the base governor pressure admitted to the port 290 and the line pressure in the port 284 is slightly higher than the base governor pressure in the port 290 in an amount that is determined by the differential of the cross sectional areas of the valve lands 276a and 276b. It will therefore be noted that the line pressure in the port 284 is equal to the pressure to which the base governor pressure is increased. This line pressure in the port 284 will accordingly be referred to as an increased governor pressure. Where the kick-down is effected, the drain of the kick-down valve is closed and the signal pressure is applied to the port 280 of the down-shift valve 118. Consequently, the valve spool 276 is moved downward so that the port 284 is brought into fluid communication with the port 286 to admit the base governor pressure therefrom to the port 284.

The kick-down valve 124 comprises a slidable valve spool 296 having spaced valve lands 296a and 296b, and a compression spring 298 biasing the valve spool 296 downward. The kick-down valve 124 has a plurality of ports 299, 300, 302, 304 and 306. The port 299 communicates through the conduit 200 with the port 178 of the manual selector valve 102. The port 300 communicates through a conduit 308 with the solenoid valve 120. The port 302 communicates through the conduit 292 with the down-shift valve 118. The port 304 is the drain port, which has been already described hereinabove. The port 306 communicates with the conduit 224 communicating with the 1-2 shift valve 112, the 2-3 shift valve 114 and the 3-4 shift valve 116.

The solenoid valve 120 comprises a slidable valve spool 310 having spaced valve lands 310a and 310b and a compression spring 312 biasing the valve spool 310 upward. The solenoid valve spool 310 has a nozzle 314 communicating with a valve chamber (no numeral) in which the valve spool 310 is slidably received, and a plurality of ports 316, 318, 320, 322, 324 and 326. The port 316, which has a flow restriction 316a therein, communicates through a conduit 328 with the hysteresis valve 128, the 2-3 shift valve 114 and the 3-4 shift valve 116. The port 318 also communicates with the conduit 328. The port 320 communicates through the conduit 308 with the port 300 of the kick-down valve 124. The port 322 communicates with a conduit 330, with which the idling valve 122 also communicates. The ports 324 and 326 are drains through which excessive fluid is drained off. The solenoid valve 120 also comprises a solenoid 332 electrically connected to a kick-down switch 333 and having a movable plunger 332a adapted to open and close the nozzle 314.

The hysteresis valve 128 comprises a slidable valve spool 336 having spaced valve lands 336a and 336b, and a compression spring 338 biasing the valve spool 338 upward. The hysteresis valve 128 has a plurality of ports 340, 342, 344, 346 and 348. The port 340 has a flow restriction 340a therein and communicates therethrough with the port 344, with which the conduit 328 also communicates. The port 342 communicates with the line pressure conduit 146. The ports 346 and 348 are drains through which the fluid is drained off. The hysteresis valve thus arranged operates in a manner well known so that a constant fluid pressure appears at the port 344 through which the constant fluid pressure is fed into the conduit 328. This fluid pressure will be hereinafter referred to as hysteresis pressure.

The idling valve 122 comprises a slidable valve spool 350 having spaced valve lands 350a and 350b, and a compression spring 352 biasing the valve spool 350 downward. The idling valve 122 has a plurality of ports 354, 356, 358, 357, 360 and 362. The ports 354 and 356 are drain ports. The port 357 communicates with a conduit 364, which in turn communicates through the floating valve 136 with the port 154 of the regulator valve 104. The port 358 communicates with the conduit 294 communicating through the floating valve 130 with the down-shift valve 118 and the conduit 294a leading to the 3-4 shift valve 116, the 2-3 shift valve 114 and the 1-2 shift valve 112. The port 360 communicates through the conduit 330 with the port 322 of the solenoid valve 120. The port 362 communicates through the conduit 170 with the throttle back-up valve 138 and the amplifier valve 106.

The throttle back-up valve 138 comprises a slidable valve spool 366 having spaced valve lands 366a and 366b, and a compression spring 368 biasing the valve spool 366 upward. The throttle back-up valve 138 has a plurality of ports 370, 372, 374, 376 and 378. The port 370 communicates with the conduit 198 leading from the manual selector valve 102, with which the port 376 also communicates. The pot 372 communicates through the conduit 224 with the throttle valve 108. The port 374 communicates with the conduit 170, with which the port 378 having a flow restriction 378a therein also communicates.

The second speed pressure reducing valve 126 comprises a slidable valve spool 380 having spaced valve lands 380a and 380b, and a compression spring 382 biasing the valve spool 380 downward. The second speed pressure reducing valve 126 has a plurality of ports 384, 386, 390, 392 and 394. The port 384 communicates through a flow restriction 384a with the servo mechanism 28' of the brake 28, with which the port 390 also communicates. The port 386 communicates with a conduit 396, which in turn communicates with the 2-3 shift valve 114. The port 392 is a drain. The port 394 communicates through the conduit 202 with the port 184 of the manual selector valve 102.

The 1-2 shift valve 112 comprises a slidable valve spool 400 having spaced valve lands 400a, 400b, 400c and 400d, and a compression spring 402 biasing the valve spool 400 downward. Indicated at 404 is a spring seat having a bore (no numeral) through which the upper end portion of the valve spool 400 extends. The 1-2 shift valve 112 has a plurality of ports 405, 406, 408, 410, 412, 414, 416, 418 and 420. The port 405 communicates with the conduit 224, with which the port 408 also communicates, the conduit 224 communicating with the throttle valve 108 port 210 to receive throttle pressure therefrom. The port 406 is a drain. The port 410 communicates through the conduit 168 with the servo mechanism 22' of the rear clutch 22 and the port 182 of the manual selector valve 102. The port 412 communicates through a conduit 422 with the servo mechanism 30' of the brake 30 and the 2-3 shift valve 114. The port 414 is a drain. The port 416 communicates through the conduit 190 and the floating valve 134 with the conduit 188 leading to the servo mechanism 26' of the brake 26 and the conduit 186 communicating with the port 174 of the manual selector valve 102. The port 418 communicates through the conduit 200 with the kick-down valve 124 and the port 178 of the manual selector valve 102. The port 420 communicates with the 2-3 shift valve 114.

The 2-3 shift valve 114 comprises a first slidable valve spool 426 having spaced valve lands 426a and 426b, and a second slidable valve spool 426' axially aligned with spool 426 and having spaced valve lands 426'a, 426'b, 426'c and 426'd. The 2-3 shift valve 114 also comprises a compression spring 428 biasing the valve spools 426 and 426' downward. The 2-3 shift valve 114 has a plurality of ports 430, 432, 434, 436, 438, 440, 442, 446, 448 and 450. The port 430 communicates through the conduit 224 with the throttle valve 108 to receive throttle pressure therefrom. The port 432 communicates through the conduit 292, with the kick-down valve 124 and the down-shift valve 118. The port 432 also communicates with the 3-4 shift valve. The port 434 communicates through the conduit 328 with the hysteresis valve 128 and the solenoid valve 120. The port 434 also communicates with the 3-4 shift valve 116. The port 436 communicates through the conduit 202 with the port 394 of the second speed pressure reducing valve 126 and the port 184 of the manual selector valve 102. The port 438 is a drain. The port 440 communicates through the conduit 396 with the port 386 of the second speed pressure reducing valve 126. The port 442 communicates through the conduit 422, with the port 412 of the 1-2 shift valve 112. The port 444 communicates through a conduit 454 with the apply side 24'a of the servo mechanism 24' of the band brake 24, and with the 3-4 shift valve 116. The port 448 communicates with the port 420 of the 1-2 shift valve 112, and with the port 450. The port 450 communicates through the 3-4 shift valve 116 with the conduit 294a.

The 3-4 shift valve 116 comprises a first slidable valve spool 456 having spaced valve lands 456a and 456b, and a second slidable valve spool 456' cooperating therewith and having spaced valve lands 456'a, 456'b and 456'c. The 3-4 shift valve 116 also comprises a first compression spring 458 biasing the valve spool 456 downward, and a second compression spring 460 disposed between the first and second valve spools 456 and 456'. The 3-4 shift valve 116 has a plurality of ports 462, 464, 466, 468, 470, 472, 474, 476 and 478. The port 462 communicates through the conduit 224 with the throttle valve 108. The port 464 communicates with the conduit 292. The port 466 communicates with the conduit 328. The port 468 communicates with the conduit 198. The port 470 communicates with the conduit 454. The port 472 communicates with the conduit 196. The port 474 is a drain. The port 476 communicates with the port 450 of the 2-3 shift valve 114, with which the port 478 also communicates.

When, in operation, the manual selector valve 102 is set to its "P" or parking position, the valve land 172b of the valve spool 172 is maintained in a position to close the port 180 communicating with the line pressure conduit 146. Under this circumstance, the line pressure is prevented from being supplied into any of the servo mechanisms of the friction elements and, therefore, the friction elements are held in their disengaged condition.

When the manual selector valve 102 is set to "R" or reverse drive position, the valve spool 172 is moved to a position to establish fluid communication between the port 180 communicating with the line pressure conduit 146 and the port 174 communicating with the conduit 186. Consequently, the line pressure in the port 180 admitted through the port 174 into the conduit 186, is fed to the floating valves 132 and 134. In this situation, the valve element or ball 132a of the floating valve 132 is moved to a position to close the conduit 196 while establishing fluid communication between the conduits 192 and 194. On the other hand, the valve element 134a of the floating valve 134 is moved to a position to close the conduit 190 while providing fluid communication between the conduits 186 and 188. Under these circumstances, the line pressure is applied to the release side 24'b of the servo mechanism 24' of the band brake 24 and at the same time supplied to the servo mechanism 20' of the front clutch 20, while the line pressure in the conduit 186 is also supplied through the floating valve 134 and the conduit 188 into the servo mechanism 26' of the brake 26. Accordingly, the front clutch 20 and the brake 26 are engaged so that the reverse drive ratio is obtained.

It should be appreciated that the line pressure supplied into the above-noted servo mechanisms 20' and 26' is regulated by the regulator valve 104 in which the valve spool 148 is maintained in its balanced position where the force developed by the line pressure acting on the valve land 148a balances with the force of the spring 160 and the force developed by the line pressure acting on the valve land 162b of the amplifier valve 106. If, in this condition, the accelerator pedal of the vehicle is kept released during idling operation of the vehicle engine, the hysteresis pressure produced by the hysteresis valve 128 is applied through the solenoid valve 120 and the idling valve 122 into the port 154 of the regulator valve 104 via the conduit 364 and the floating valve 136. The hysteresis pressure thus admitted to the port 154 acts on the cross sectional area differential between the valve lands 148a and 148b of the valve spool 148 thereby to apply additional downward force onto the valve spool 148, which is consequently moved downward against the force of the spring 160 and the force developed by the line pressure acting on the valve land 162b of the amplifier valve spool 162. Thus the degree of fluid communication between the port 152 and the drain 157 is increased so that the line pressure is lowered below that produced during the period the accelerator pedal is depressed. Accordingly, smooth shifting into the reverse gear ratio is obtained.

When the manual selector valve 102 is set to its "N" or neutral position, the valve spool 172 is maintained in a position to prevent the supply of line pressure to any of the servo mechanisms of the friction elements so that all the friction elements are maintained in their disengaged conditions and the power transmission is held in its neutral condition.

When the manual selector valve 102 is shifted into "D" or automatic forward drive position, the valve spool 172 is moved to a position to provide fluid communication between the ports 180 and 182 so that the line pressure in the port 180 is admitted to the conduit 168. The line pressure in the conduit 168 is then supplied into the servo mechanism 22' of the rear clutch 22 and at the same time fed into the port 410 of the 1-2 shift valve 112. In this condition, the 1-2 shift valve 112 is also supplied with throttle pressure delivered from the conduit 224 communicating with the throttle valve 108 and increased governor pressure delivered through the branch conduit 294a communicatng with the downshift valve 118. The throttle pressure admitted to the ports 405 and 408 of the 1-2 shift valve 112 acts on the upper end of the valve spool 400 and the cross-sectional area differential between the valve lands 400a and 400b thereby applying downward force onto the valve spool 400. The increased governor pressure fed into the port 420 via the branch conduit 294a acts on the valve land 400d thereby applying upward force onto the valve spool 400. If, under these circumstances, the vehicle speed is low and the governor pressure is low, the valve spool 400 is moved downward, viz., in a position shown in FIG. 2 by the actions of the force developed by the throttle pressure acting on the valve spool 400 and the force of the compression spring 402. Accordingly, the port 410 of the 1-2 shift valve 112 is closed by the valve land 400b of the valve spool 400 so that the line pressure is prevented from being supplied into the servo mechanism 30' of the brake 30. Thus, only the servo mechanism 22' of the rear clutch 22 is actuated with the low one-way brake 38 so that the forward first forward drive gear ratio is obtained.

As the vehicle speed increases and accordingly the governor pressure increases the valve spool 400 is moved upward against the force of the spring 402 and the force developed by the throttle pressure acting on the valve spool 400. In this condition, the port 410 is brought into fluid communication with the port 412 so that the line pressure in the conduit 168 is admitted to the conduit 422. The line pressure admitted to the conduit 422 is fed into the servo mechanism 30' and, thus, the brake 30 is engaged with the rear clutch 22 kept engaged so that the forward second forward drive gear ratio is obtained. As the valve spool 400 is held in its uppermost position, the valve spool 400 is biased downward only by the force of the spring 402 and the force developed by the throttle pressure acting on the upper end of the valve spool 400 because the throttle pressure admitted to the port 408 is drained off through the drain 406.

When the port 410 is maintained in fluid communication with the port 412, the line pressure admitted to the port 412 is also fed into the port 442 of the 2-3 shift valve 114. At the same time, throttle pressure is delivered into the port 430 of the 2-3 shift valve and acts on the valve land 426b. Moreover, hysteresis pressure which is produced by the hysteresis valve 128 and fed through the conduit 328 is delivered into the port 434 of the 2-3 shift valve 114 and acts on the cross-sectional area differential between the valve lands 426a and 426b. Thus, the valve spool 426 and accordingly the valve spool 426' coating therewith are biased downward by the forces developed by the throttle pressure and the hysteresis pressure acting on the valve spool 426 and the force of the compression spring 428. Since, furthermore, the valve land 426'b is slightly larger in cross section than that of the valve land 426'a, the valve spool 426' is further biased downward by the force developed by the line pressure acting on the area differential between the valve lands 426'a and 426'b. These downward forces acting on the valve spools 426 and 426' are opposed by the force developed by the increased governor pressure acting on the valve land 426'doof the valve spool 426'. Under these circumstances, if the vehicle speed is low, the level of the increased governor pressure is low and, therefore, valve spools 426 and 426' are held in their lowermost positions as shown in FIG. 2. In this situation, the port 440 is brought into fluid communication with the port 442, so the line pressure admitted through the conduit 422 to the port 442 of the 2-3 shift valve 114 is delivered through the port 440 into the conduit 396 through which the line pressure is fed into the port 386 of the second speed pressure reducing valve 126. In the "D" range, the valve spool 380 of the second speed pressure reducing valve 126 is moved downward by the force of the compression spring 382 and the port 386 is blocked by the valve land 380a of the valve spool 380 so that the line pressure is prevented from being supplied into the servo mechanism 28' of the brake 28.

As the vehicle speed increases and accordingly the governor pressure further increases, the valve spools 426 and 426' are moved upward so that the port 434 is closed by the valve land 426b while the drain 438 is opened by the valve land 426'a. In this condition, the fluid communication between the ports 442 and 440 is interrupted while fluid communication is provided between the ports 442 and 444. Consequently, the line pressure in the port 442 is admitted to the port 444, through which the line pressure is delivered to the apply side 24'a of the servo mechanism 24' of the band brake 24 via the conduit 454 so that the band brake 24 is engaged with the rear clutch 22 kept engaged. Thus, the forward third speed ratio is obtained. It will be noted that, as the valve spools 426 and 426' are held in their upper most positions, the hysterisis pressure is prevented from acting on the cross-sectional area differential between the valve lands 426a and 426b and, moreover, the line pressure in the port 442 is prevented from acting on the cross-sectional area differential between the valve lands 426'a and 426'b whereby downshift is effected at a lower vehicle speed from third to second forward drive gear ratio.

The line pressure in the conduit 454 is also delivered into the port 470 of the 3-4 shift valve 116. At the same time, throttle pressure from the throttle valve 108 is delivered into the port 462 of the 3-4 shift valve 116 and hysteresis pressure from the hysteresis valve 128 is fed into the port 466 through the conduit 328. In this condition, the throttle pressure in the port 462 acts on the valve land 456a of the valve spool 456 and the hysteresis pressure in the port 466 acts on the cross-sectional area differential between the valve lands 456a and 456b thereby urging the valve spools 456 and 456' downward with the force of the compression spring 458. At the same time, the line pressure in the port 470 acts on the differential cross sectional area between the valve lands 456'a and 456'b of the valve spool 456 thereby further urging the valve spool 456 downward. These downward forces acting on the valve spools 456 and 456' are opposed by the force developed by the increased governor pressure acting on the valve land 456'c of the valve spool 456'. If, under these circumstances, the vehicle speed is below a certain given value, the port 470 is prevented from communicating with the port 472 by the valve land 456'b. As the vehicle speed exceeds beyond the certain given value, the valve spools 456 and 456' are moved upward by the force developed by the increased governor pressure acting on the valve land 456'c. Accordingly, the port 470 is brought into fluid communication with the port 472 and, therefore, the line pressure in the port 470 is delivered through the port 472 into the conduit 196. This causes the valve element or ball 132a of the floating valve to close the conduit 192 while providing fluid communication between the conduits 194 and 196. Thus, the line pressure is fed through the conduit 194 into the release side 24'b of the servo mechanism 24' and the servo mechanism 20' and, accordingly, the band brake 24 is disengaged while the front clutch 20 is engaged with the rear clutch 22 kept engaged so that the forward fourth speed drive ratio is provided. It will be appreciated that the downshift is effected from fourth to third speed drive ratio at the lower vehicle speed side in a manner as previously stated.

If the accelerator pedal is fully depressed when the manual selector valve 102 is set in its "D" range position, the kick-down switch 333 is closed and the shifting point is raised in a manner as will be subsequently described.

When the kick-down switch 333 is closed, the solenoid 332 of the solenoid valve 120 is energized so that the plunger 332a is retracted thereby opening the nozzle 314. In this situation, the fluid under pressure in the port 316 is drained off through the nozzle 314 and, therefore, the valve spool 310 is moved upward by the action of the compression spring 312. Under this circumstance, the port 318 is brought into fluid communication with the port 320 so that the hysteresis pressure from the hysteresis valve 128 is fed through the conduit 308 into the port 300 of the kick-down valve 124. Since, at the same time, the port 306 of the kick-down valve 124 is supplied with throttle pressure from the throttle valve 108 via the conduit 224 and the level of the throttle pressure produced when the accelerator pedal is depressed is high, the valve spool 296 of the kick-down valve 124 is moved upward against the force of the compression spring 298. In this condition, the port 300 is brought into fluid communication with the port 302 and, therefore, the hysteresis pressure in the port 300 is admitted thereto. The hysteresis pressure in the port 302 is then delivered through the conduit 292 into the port 280 of the down-shift valve 118. The hysteresis pressure thus admitted to the port 280 acts on the valve land 276a of the valve spool 276, thereby moving the same downward. As already discussed hereinabove, when the valve spool 276 is moved downward, the port 284 communicating with the branch conduit 294a through the floating valve 130 is brought into fluid communication with the port 286 and, therefore, the base governor pressure is supplied into the branch conduit 294a. Since, as previously noted, the level of the base governor pressure is lower than the increased governor pressure, the down shifting point is raised to a higher vehicle speed.

It should be noted that the hysteresis pressure in the conduit 308 is also delivered through the port 322 of the solenoid valve 120 into the port 360 of the idling valve 122 via the conduit 330 but the hysteresis pressure is prevented from being fed into any of the ports 357 and 358 because the valve spool 350 of the idling valve 122 is moved upward against the force of the compression spring 352 by the force developed by the throttle pressure acting on the valve land 350b.

During normal driving conditions, the kick-down switch 333 is kept open, so that the solenoid 332 is de-energized and the plunger 332a protrudes to close the nozzle 314 of the solenoid valve 120. In this condition, the hysteresis pressure admitted to the port 316 through the flow restriction 316a acts on the valve land 310a thereby moving the valve spool 310 downward against the force of the compression spring 312. As a result, the port 318 is closed by the valve land 310a and the port 320 is brought into fluid communication with the drain 324 so that the hysteresis pressure is not admitted to the kick-down valve 124 and, therefore, the kick-down operation is prevented.

It should be noted that, the solenoid 332 of the solenoid valve 120 is arranged to be energized when the vehicle engine begins to operate at idling where the manual selector valve 102 is set to its "D" range position. To this end, the accelerator pedal (not shown) is provided with switch means of the type which is closed when the accelerator pedal is released where the manual selector valve 102 is set to the "D" range position. With this arrangement, if the accelerator pedal is released when the manual selector valve 102 is in its "D" position, the switch means is closed so that the solenoid of the solenoid valve 120 is energized to cause the plunger 332a to retract thereby opening the nozzle 314. In this condition, the valve spool 310 is moved upward by the action of the spring 312 to provide fluid communication between the ports 320 and 322. Thus, the hysteresis pressure in the conduit 328 is admitted to the conduit 330, through which the hysteresis pressure is delivered into the port 360 of the idling valve 122. Since, in this instance, the throttle pressure admitted to the port 362 of the idling valve 122 is low during idling of the engine, the valve spool 350 is moved downward by the action of the spring 352 and, therefore, the port 360 is brought into fluid communication with the port 358. Thus, the hysteresis pressure admitted to the port 360 is admitted to the port 358, through which the hysteresis pressure is delivered into the conduit 294. Since the hysteresis pressure is higher than the base governor pressure or the increased governor pressure, the ball 130a of the floating valve 130 is moved to the position to provide fluid communication between the conduits 294 and 294a. Thus, the hysteresis pressure in the conduit 294 is delivered into the conduit 294a, through which the hysteresis pressure is admitted to the ports 478 of the 3-4 shift valve 116, 450 of the 2-3 shift valve 114 and 420 of the 1-2 shift valve 112. Consequently, the valve spools 456, 456', 426, 426' and 400 are moved upward as viewed in FIG. 2, so that the forward fourth speed drive ratio is provided and, therefore, the creep phenomenon of the vehicle is prevented.

If the accelerator pedal is depressed to start the vehicle, then the switch means associated with the accelerator pedal is open so that the solenoid valve 120 is de-energized and, accordingly, the nozzle 314 is closed by the plunger 332a whereby the valve spool 310 is moved downward to provide fluid communication between the port 322 and the drain 324. Accordingly, fluid in the conduits 294 and 330 is drained off through the drain 324. Thus, the hysteresis pressure is not applied to the valve spools of the respective shift valves and, therefore, the respective valve spools of the shift valves are moved downward by the actions of the respective springs so that the forward first speed drive ratio is provided to start the vehicle to move.

In the "D" range position of the manual selector valve 102, as described hereinabove, the level of the line pressure is regulated by the fluid under pressure acting on the valve land 148a of the valve spool 148, the fluid under pressure acting on the cross-sectional area differential between the valve lands 148a and 148b, the fluid under pressure acting on the cross-sectional area differential between the valve lands 162a and 162b of the valve spool 162 of the amplifier valve 106, the throttle pressure acting on the valve land 162b of the amplifier valve spool 162 and the force of the compression spring disposed between the valve spools 148 and 162.

To the port 154 of the regulator valve 104, fluid under pressure is supplied through the floating valve 136. The position of the valve element 136a of the floating valve 136 depends on the level of the pressures supplied through the conduits 168 and 364 and acting thereon. In the case of "D" range position of the manual selector valve 102, accordingly, the conduit 168 is supplied with line pressure so that the valve element 136a of the floating valve 136 assumes the position to close the conduit 364 and, therefore, the line pressure is fed into the port 154 of the regulator valve 104. Since, in this instance, the level of the hysteresis pressure admitted to the conduit 364 is lower than the line pressure during idling of the vehicle engine, the regulator valve 104 is prevented from being affected by the hysteresis pressure admitted to the conduit 364.

Moreover, the hysteresis pressure also appears in the conduit 364 when the manual selector valve 102 is shifted into the "R" or reverse drive position. Since, in this condition, the port 182 of the manual selector valve 102 is brought into fluid communication with the drain, line pressure is not admitted to the conduit 168 so that the valve element 136a of the floating valve 136 is moved in a position in which the hysteresis pressure is admitted to the port 154 of the regulator valve. Thus, the level of the line pressure is reduced during idling of the vehicle engine where the manual selector valve 102 is set to the "R" range position.

When the manual selector valve 102 is shifted into the "3" position, the port 180 is brought into fluid communication with the ports 182 and 176. Thus, the line pressure is admitted to the conduit 198 in addition to the conduit 168. The line pressure admitted to the conduit 198 is fed into the port 468 of the 3-4 shift valve 116 and the ports 370 and 376 of the throttle back-up valve 138. The line pressure in the port 370 acts on the valve land 366a of the valve spool 366 thereby moving the same downward against the force of the compression spring 368, whereby the port 376 is brought into fluid communication with the port 374 and the line pressure is admitted to the conduit 170 through which the line pressure is admitted to the port 166 of the amplifier valve 106. On the other hand, the line pressure admitted to the port 468 of the 3-4 shift valve 116 acts on the valve land 456b of the valve spool 456 and the valve land 456'a of the valve spool 456', thereby moving the valve spool 456 upward while moving the valve spool 456' downward irrespective of the levels of the governor pressure and the throttle pressure. Thus, the forward third speed drive ratio is provided. In the same instance, the 1-2 shift valve 112 and the 2-3 shift valve 114 operate in the same manner as in the automatic "D" range position of the selector valve 102 with the exception that the level of the line pressure applied to the servo mechanisms is regulated irrespective of the throttle pressure in a manner as will be described. As already discussed, the line pressure is supplied to the port 166 of the amplifier valve 106 when the manual selector valve is shifted into " # " range position. Therefore, the level of the line pressure regulated by the regulator valve is varied irrespective of the throttle pressure.

It is desirable to stop the "creep" preventive action of the valve mechanisms when the manual selector valve 102 is shifted into the "3" position so that the automatic power transmission is prevented from being shifted into the forward fourth speed gear ratio. This is achieved by admitting the line pressure through the throttle back-up valve 138 into the conduit 170, through which the line pressure is fed into the port 362 of the idling valve 122. Accordingly, the valve spool 350 of the idling valve 122 is held in its uppermost position against the force of the compression spring 352 irrespective of the variations in the throttle pressure. In this condition, the port 360 is blocked by the valve land 350b while the port 358 is brought into communication with the drain 356 so that the fluid in the conduit 294 is drained off through the drain 356. Thus, the hysteresis pressure is prevented from being applied to the conduit 294a and, therefore, the valve spools of the respective shift valves are moved downward whereby the "creep" preventive action of the valve mechanisms is inhibited.

When the manual selector valve is shifted into the "2" range position, the port 180 is brought into fluid communication with the ports 176, 182 and 184 and the line pressure is also fed into the conduit 202. The line pressure in the conduit 202 is delivered into the port 436 of the 2-3 shift valve 114. Assuming now that the valve spools 426 and 426' are maintained in their upper extreme positions when the automatic power transmission is shifted into the forward third speed gear ratio, downshift is effected from the forward third speed gear ratio to the second speed gear ratio because the valve spool 426' is moved downward by the force developed by the line pressure admitted to the port 436 while the valve spool 426 is moved upward by the force developed by the line pressure admitted to the port 436. Thus, in this case, the downshift is effected from the higher speed gear ratio to the lower speed gear ratio by the line pressure irrespective of the variations in throttle pressure delivered into the port 430 of the 2-3 shift valve 114. It should be noted that, as the valve spool 426' is moved downward, the port 440 is brought into fluid communication with the port 442 and the line pressure acts on the cross-sectional area differential between the valve lands 426'a and 426'b of the valve spool 426' thereby applying a downward force thereonto. Accordingly, the valve spool 426' is prevented from being moved upward unless highly increased governor pressure is applied to the port 450. As already described, when the valve spool 426' is moved downward, the port 442 is brought into fluid communication with the port 440 so that the line pressure is admitted to the conduit 396. The line pressure in the conduit 396 is delivered into the port 386 of the second speed pressure reducing valve 126. Since, at the same time, the line pressure is fed into the port 394 of the second speed pressure reducing valve 126 through the conduit 202 communicating with the port 184 of the manual selector valve 102. Accordingly, the valve spool 380 of the second speed pressure reducing valve 126 is moved upward against the force of the compression spring 382 so that the port 386 is brought into fluid communication with the port 390 and the line pressure is admitted thereinto. The line pressure admitted to the port 390 is fed through the flow restriction 384a into the port 384, through which the line pressure acts on the upper surface of the valve land 380 thereby applying the downward force onto the valve spool 380. In this condition, the port 390 is brought into fluid communication with the drain 392 and, therefore, the fluid in the port 390 is drained to reduce the level of the line pressure acting on the valve land 380. Under these circumstances, the valve spool 380 is held in its balanced position where the force of the compression spring and the force developed by the line pressure acting on the valve land 380a of the valve spool 380 balances with the force developed by the line pressure acting on the valve land 380b. Thus, the level of the line pressure in the port 384 is regulated to a level which is lower by the action of the compression spring 382. The line pressure thus reduced by the second speed pressure reducing valve 126 is thereafter fed into the servo mechanism 28' of the brake 28 engaging it while, at the same time, the rear clutch 22 is engaged so that a two way second forward speed gear ratio is obtained. If, in this instance, the level of the line pressure supplied into the servo mechanism 28' is too high, smooth engagement of the brake 28 can not be obtained, whereas, if the level of the line pressure in the servo mechanism 28' is too low, it takes a longer time before complete engagement of the brake 28 and, therefore, engine braking action can not be provided.

To eliminate these drawbacks, the hydraulic control system of the present invention features the second speed pressure reducing valve 126 which is arranged to adjust the level of the line pressure supplied into the servo mechanism for the brake 28 to a level proper for effecting smooth shifting between the gear ratios. It should be understood that an appropriate engine braking action is provided by merely changing the spring force of the compression spring 382 to modify the line pressure to a proper value. When the manual selector valve 102 is maintained in its "2" range position, upshift from first to second speed drive ratio is effected in the same manner as in the "D" range position of the manual selector valve 102. It will be appreciated that the creep preventive action of the valve mechanism is inhibited in a manner as described with reference to the "3" range position when the manual selector valve 102 is shifted into the "2" range position. It will also be noted that the line pressure supplied into the servo mechanisms when the manual selector valve is shifted into the "2" range position is varied in the same manner as in the case where the manual selector valve 102 is shifted into the "3" range position.

If the manual selector valve 102 is inadvertently shifted into the "2" range position when the vehicle is running in the fourth gear, the level of the governor pressure acting on the valve spool 426' is high so that the valve spool 426' is not immediately moved downward and the power transmission is firstly shifted into the forward third speed gear ratio. As the vehicle speed decreases to some extent, the level of the governor pressure delivered into the 2-3 shift valve 114 is decreased and, therefore, downshift from the third speed gear ratio to the second is obtained. Thus, overrunning condition of the vehicle engine is prevented even if the manual selector valve is inadvertently shifted into the "2" range position when the vehicle is running at high speed gear ratio.

When, now the manual selector valve 102 is shifted into the "1" range position, the port 180 is brought into fluid communication with the port 178 in addition to the ports 176 and 184. The line pressure in the port 180 is accordingly fed into the conduit 200, through which the line pressure is delivered into the port 418 of the 1-2 shift valve 112. Assuming now that the manual selector valve 102 is shifted into the "2" range position when the valve spool 400 is moved upward where the power transmission is maintained in its second speed gear ratio, downshift is effected between two gear ratios in the same manner as in the "D" range position of the valve 102. In this instance, the valve spool 400 is moved downward and the port 418 is brought into fluid communication with the port 416 so that the line pressure acts on the cross-sectional area differential between the valve lands 400c and 400d thereby biasing the valve spool 400 downward while the downward force developed by the throttle pressure acting on the valve 400 further biases the valve spool 400 downward. Thus, the upshift from the first speed gear ratio to another one is prevented unless extremely high governor pressure is supplied into the port 420.

With the arrangement mentioned hereinabove, the power transmission is not shifted into the first speed gear ratio even if the manual selector valve 102 is inadvertently shifted into the "1" range position when the vehicle is running in the fourth gear and, therefore, the overrunning condition of the vehicle engine is prevented. If, now, the manual selector valve 102 is inadvertently shifted into the "1" range position when the vehicle is running in the fourth gear, the 3-4 shift valve 116 operates to deliver line pressure to the servo mechanism so as to cause the power transmission to shift into third speed gear ratio. As the vehicle speed decreases, the power transmission is shifted into the second speed gear ratio due to the function of the 2-3 shift valve 114. Thereafter, as the vehicle speed further decreases, the power transmission is shifted into the first speed gear ratio due to the function of the 1-2 shift valve 112.

It should be noted that the creep preventive action of the valve mechanism is inhibited in the "1" range position of the manual selector valve 102 in a manner as already described hereinabove.

It should now be understood from the foregoing description that a throttle valve incorporated in a hydraulic control system of an automatic power transmission is arranged to be controlled by a fluid under pressure which is varied in dependence on the engine intake manifold vacuum whereby throttle pressure varies non-linearly with the variations in the engine intake manifold vacuum to thereby adjust the line pressure to an appropriate level for effecting smooth shifting between gear ratios.

It should also be noted that the throttle valve implementing the present invention has the following advantages:

1. The throttle valve according to the present invention provides throttle pressure which varies slowly when the engine intake manifold vacuum is high and sharply when the engine intake manifold vacuum is relatively low whereby an appropriate shift pattern is provided.

2. The line pressure is controlled by throttle pressure which varies in close relationship to the engine intake manifold vacuum so that shifting shocks are eliminated.

3. The operating characteristic of the throttle valve according to the present invention can be readily modified without significant changes of the valve construction to meet the respective operating characteristic of the individual engine.

What is claimed is:

1. In a hydraulic control system for an automatic power transmission of an internal combustion engine driven vehicle, which control system includes friction engaging means to effect shifts to different gear ratios and a source of pressurized fluid for supplying line pressure to said friction engaging means, the combination comprising:

a first valve chamber having a first port communicating with said source of pressurized fluid, a second port and a third port;

a second valve chamber having a first port communicating with said second port of said first valve chamber, a second port communicating with said second port of said first valve chamber, and a third port communicating with said third port of said first valve chamber;

a first valve spool slidably disposed in said first chamber and movable in response to intake manifold vacuum of said engine for controlling fluid communication between said first and second ports of said first valve chamber for thereby producing throttle pressure in said second port of said first valve chamber in dependence on said intake manifold vacuum, said first valve spool including first and second valve lands exposed to said third port of said first valve chamber;

a second valve spool slidably disposed in said second valve chamber including first and second valve lands of different diameters exposed to said third port of said second valve chamber, said first valve land of said second valve spool being exposed at its one end to said throttle pressure admitted to said first port of said second valve chamber so that said second valve spool is movable in response to said throttle pressure to control fluid communication between said second and third ports of said second valve spool for thereby producing modified throttle pressure in said third port of said second valve spool; and biasing means urging said second valve spool in one direction against the force developed by said throttle pressure acting on said one end of said first valve land and the force developed by said modified throttle pressure acting on different area between said first and second valve lands of said second valve spool;

said second valve spool being moved in another direction to decrease the level of said modified throttle pressure to be delivered to said third port of said first valve chamber and acting on different area between said first and second valve lands of said first valve spool when said throttle pressure is above a predetermined level whereas when said throttle pressure is below said predetermined level said second valve spool is moved in said one direction by the force of said biasing means for thereby increasing the level of said modified throttle pressure; and said first valve spool being movable in response to said modified throttle pressure acting on said differential area between said first and second valve lands thereof in a direction to decrease the level of said throttle pressure for thereby modulating said throttle pressure in dependence thereon in close relationship with a vehicle engine load.

2. The combination according to claim 1, in which said first and second valve spools are disposed in concentric relationship with respect to each other.

3. The combination according to claim 1, in which said first and second valve spools are disposed in parallel relationship to each other.

* * * * *